(12) United States Patent
Hill

(10) Patent No.: US 8,990,426 B2
(45) Date of Patent: Mar. 24, 2015

(54) METHODS, SYSTEMS, AND COMPUTER PROGRAM PRODUCTS FOR PROVIDING ELECTRONIC TRANSACTIONS

(75) Inventor: N. Peter Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 808 days.

(21) Appl. No.: 11/946,226

(22) Filed: Nov. 28, 2007

(65) Prior Publication Data

US 2009/0138543 A1    May 28, 2009

(51) Int. Cl.
| | |
|---|---|
| G06Q 30/06 | (2012.01) |
| G06F 15/16 | (2006.01) |
| H04N 1/23 | (2006.01) |
| H04N 21/00 | (2011.01) |
| H04N 21/40 | (2011.01) |
| H04L 12/18 | (2006.01) |

(52) U.S. Cl.
CPC .............. G06Q 30/06 (2013.01); G06F 15/16 (2013.01); H04N 1/2361 (2013.01); H04N 21/00 (2013.01); H04N 21/40 (2013.01); H04L 12/1822 (2013.01)
USPC ......... 709/246; 709/202; 455/556; 455/556.1

(58) Field of Classification Search
CPC ..................... G06F 15/16; H04M 2215/7245
USPC ........................................................ 709/246
See application file for complete search history.

(56) References Cited

U.S. PATENT DOCUMENTS

| | | | | |
|---|---|---|---|---|
| 6,981,223 B2 * | 12/2005 | Becker et al. | ................. | 715/753 |
| 7,016,877 B1 * | 3/2006 | Steele et al. | .................... | 705/50 |
| 7,127,524 B1 * | 10/2006 | Renda et al. | .................. | 709/245 |
| 7,139,974 B1 * | 11/2006 | Bascom et al. | ................ | 715/236 |
| 7,379,901 B1 * | 5/2008 | Philyaw | .......................... | 705/17 |
| 7,480,701 B2 * | 1/2009 | Smith et al. | .................... | 709/217 |
| 7,539,484 B2 * | 5/2009 | Roundtree | ................. | 455/414.1 |
| 7,800,694 B2 * | 9/2010 | Morris et al. | ................. | 348/556 |
| 2002/0069295 A1 * | 6/2002 | Edwards et al. | .............. | 709/246 |
| 2002/0151327 A1 * | 10/2002 | Levitt | ............................. | 455/556 |
| 2003/0095550 A1 * | 5/2003 | Lewis et al. | .................... | 370/392 |
| 2003/0135608 A1 * | 7/2003 | Bodin et al. | .................. | 709/224 |
| 2003/0158928 A1 * | 8/2003 | Knox et al. | .................... | 709/223 |
| 2003/0191816 A1 * | 10/2003 | Landress et al. | ............. | 709/219 |
| 2004/0019900 A1 * | 1/2004 | Knightbridge et al. | ......... | 725/23 |
| 2004/0132438 A1 * | 7/2004 | White | ............................ | 455/418 |
| 2005/0033855 A1 * | 2/2005 | Moradi et al. | ................ | 709/231 |
| 2005/0108320 A1 * | 5/2005 | Lord et al. | .................... | 709/201 |
| 2005/0232186 A1 * | 10/2005 | Karaoguz et al. | ............. | 370/328 |
| 2006/0026067 A1 * | 2/2006 | Nicholas et al. | ............... | 705/14 |
| 2006/0029296 A1 * | 2/2006 | King et al. | .................... | 382/313 |
| 2006/0072150 A1 * | 4/2006 | Justice | ......................... | 358/1.15 |
| 2006/0080253 A1 * | 4/2006 | Blackson et al. | .............. | 705/43 |
| 2006/0161635 A1 * | 7/2006 | Lamkin et al. | ................ | 709/217 |
| 2006/0241958 A1 * | 10/2006 | Blanchard et al. | ................ | 705/1 |
| 2007/0234398 A1 * | 10/2007 | Muehlbauer | .................. | 725/145 |

(Continued)

*Primary Examiner* — O.C. Vostal

(74) *Attorney, Agent, or Firm* — Cantor Colburn LLP

(57) ABSTRACT

Methods, systems, and computer program products for providing electronic transactions are provided. A method includes presenting an offer on a first communications device to conduct an electronic transaction on another communications device that is different from the first communications device. In response to an acceptance of the offer and selection of the other communications device, the method includes retrieving a network address for the other communications device from a storage device, and executing the electronic transaction on the other communications device via the network address.

18 Claims, 3 Drawing Sheets

(56) References Cited

U.S. PATENT DOCUMENTS

| | | | |
|---|---|---|---|
| 2007/0239867 A1* | 10/2007 | Belimpasakis et al. | 709/224 |
| 2007/0250863 A1* | 10/2007 | Ferguson | 725/46 |
| 2007/0250872 A1* | 10/2007 | Dua | 725/81 |
| 2007/0276926 A1* | 11/2007 | LaJoie et al. | 709/219 |
| 2008/0040279 A1* | 2/2008 | Coppinger et al. | 705/44 |
| 2008/0066137 A1* | 3/2008 | Cox et al. | 725/135 |
| 2008/0098450 A1* | 4/2008 | Wu et al. | 725/132 |
| 2008/0168509 A1* | 7/2008 | Yu et al. | 725/93 |
| 2008/0189752 A1* | 8/2008 | Moradi et al. | 725/105 |
| 2008/0209491 A1* | 8/2008 | Hasek | 725/114 |
| 2008/0250431 A1* | 10/2008 | Lee et al. | 719/328 |
| 2008/0261686 A1* | 10/2008 | Bedingfield | 463/29 |
| 2008/0281699 A1* | 11/2008 | Whitehead | 705/14 |
| 2008/0281951 A1* | 11/2008 | Branam et al. | 709/223 |
| 2009/0031006 A1* | 1/2009 | Johnson | 709/218 |
| 2009/0052359 A1* | 2/2009 | Yerubandi et al. | 370/310 |
| 2010/0131584 A1* | 5/2010 | Johnson | 709/203 |

* cited by examiner

METHODS, SYSTEMS, AND COMPUTER PROGRAM PRODUCTS FOR PROVIDING ELECTRONIC TRANSACTIONS

BACKGROUND

Exemplary embodiments relate generally to network communications, and more particularly, to methods, systems, and computer program products for providing electronic transactions.

Currently, there has been an explosion of demand for a wide variety of communications devices, including both wireline and wireless. Due to advances in technology, as well as the convenience of portability, wireless communications devices (e.g., cellular telephones and personal digital assistants) are becoming increasingly popular. Likewise, wireline communications devices, such as personal desktop computers and interactive programming devices (e.g., Internet Protocol-enabled television (IPTV)) are also extremely popular. As the costs of these devices continue to decrease over time, it is not uncommon for an individual to own multiple communications devices, each of which may provide unique (and sometimes overlapping) media-related services for the owner. A unique service may include downloading a ring tone to a cellular telephone, whereas an overlapping service may include downloading a movie to a personal computer, IPTV, or even a cellular telephone. As with individuals, it is also becoming commonplace for households to have multiple communications devices (e.g., personal desktop and computers, cellular, PSTN, and Internet telephones, personal digital assistants, and IPTV devices).

Managing these communications devices, including the media-related services provided for these devices, can be a daunting task. For example, a media transaction, such as downloading a ring tone to one cellular telephone may be a simple task, but downloading the same ring tone for a family of cellular telephones requires a separate download process for each device. In addition, an owner of multiple devices, who is currently active on one of the devices, may be able to conduct a media-related transaction for that active device, but not for others of the communications devices.

What is needed, therefore, is a way to conduct and manage media-related transactions for selected communications devices.

BRIEF SUMMARY

Exemplary embodiments include methods for providing electronic transactions. A method includes presenting an offer on a first communications device to conduct an electronic transaction on another communications device that is different from the first communications device. In response to an acceptance of the offer and selection of the other communications device, the method includes retrieving a network address for the other communications device from a storage device, and executing the electronic transaction on the other communications device via the network address.

Additional exemplary embodiments include systems for providing electronic transactions. A system includes a computer system and an electronic transaction application executing on the computer system. The electronic transaction application implements a method. The method includes presenting an offer on a first communications device to conduct an electronic transaction on another communications device that is different from the first communications device. In response to an acceptance of the offer and selection of the other communications device, the method includes retrieving a network address for the other communications device from a storage device, and executing the electronic transaction on the other communications device via the network address.

Further exemplary embodiments include computer program products for providing electronic transactions. A computer program product includes instructions for causing a computer system to implement a method. The method includes presenting an offer on a first communications device to conduct an electronic transaction on another communications device that is different from the first communications device. In response to an acceptance of the offer and selection of the other communications device, the method includes retrieving a network address for the other communications device from a storage device, and executing the electronic transaction on the other communications device via the network address.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Methods, systems, and computer program products for providing electronic transaction services are provided. The electronic transaction services enable defined communities of users to conduct electronic transactions via selected communications devices defined for the community. In exemplary embodiments, the electronic transactions may be initiated via one communications device and executed on one or more other communications devices within the community. The electronic transactions may include downloading a media file, receiving a coupon or printed item, and recording a media content item, to name a few. In exemplary embodiments, the community of users may be members of a household.

Figure 1:
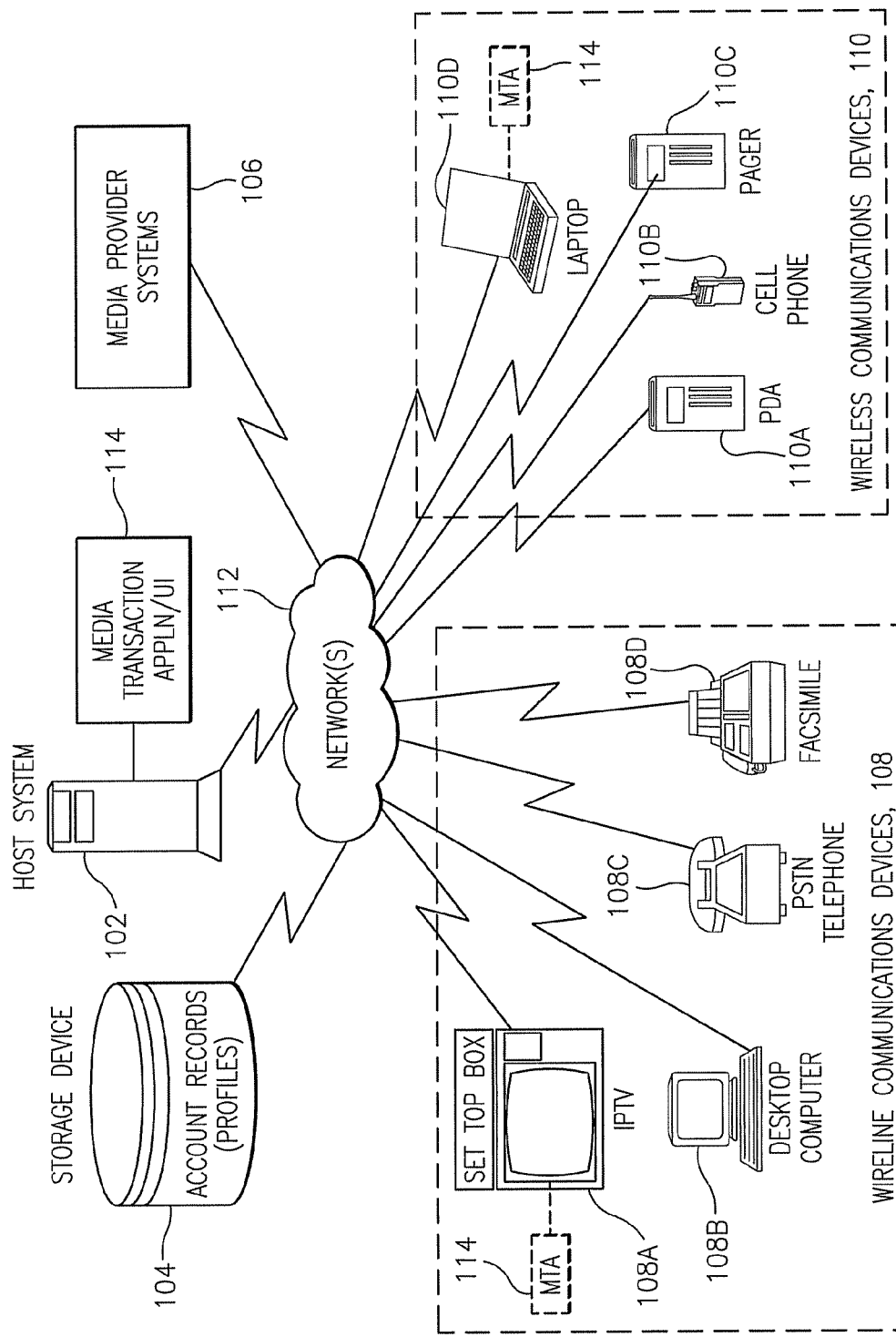
FIG. 1 is a block diagram of a system upon which electronic transactions may be implemented in accordance with exemplary embodiments.

Turning now to FIG. 1, a system upon which the electronic transactions may be implemented in accordance with exemplary embodiments will now be described. The system of FIG. 1 may include a host system 102, a storage device 104, media provider system(s) 106, and communications devices 108 and 110 in communication over one or more networks 112.

In one exemplary embodiment, the host system 102 executes computer instructions for performing electronic transaction services. The host system 102 may be implemented using a high-speed processing device (e.g., a computer system) that is capable of handling high volume activities conducted via the communications devices (e.g., communications devices 108 and 110), as well as other network entities. The host system 102 may be implemented by a network service provider, content service provider, or other enterprise.

The communications devices 108 refer to wireline communications devices, and may include, e.g., an Internet Protocol-enabled television (IPTV) 108A, a general-purpose desktop or laptop computer 108B, a telephone 108C, and a facsimile 108D. The IPTV 108A may communicate interactively over the networks 112 via a set top box and an access technology such as broadband cable or digital subscriber line (DSL) technologies. The personal computer 108B may operate over one or more of the networks 112 via an access technology such as, but not limited to, DSL technology, cable modem technology, or dial-up technology. The wireline telephone 108C and the facsimile 108D may communicate over a public switched telephone network (PSTN), which may be one of the networks 112.

The wireless communications devices 110 may include a personal digital assistant (PDA) 110A, a cellular telephone 110B, a pager 110C, and a wireless laptop computer 110D. The personal digital assistant 110A may operate over a wireless data network, using Internet protocols (e.g., TCP/IP). The cellular telephone 110B may operate over a wireless cellular network (e.g., one of the networks 112) using various wireless protocols (e.g., 802.11, WiFi).

It will be understood that other types of communications devices may be employed in implementing the electronic transaction services. The above-described communications devices 108, 110 are provided as non-limiting examples only and are not intended to limit the scope of the exemplary embodiments described herein. For example, a printer, a dual-mode wireless phone, or computer-implemented telephone (e.g., session initiation protocol-enabled (SIP) device) may be employed.

In one exemplary embodiment, the communications devices 108 and 110 are owned/operated by one or more individuals that share some relationship (e.g., members of a household). This relationship is referred to herein as a defined community. While only eight communications devices 108A-108D and 110A-110D are shown in the system of FIG. 1, it will be understood that any number of such communications devices may be used to form the community of communications devices described herein.

The networks 112 may be any type of known networks including, but not limited to, a wide area network (WAN), a local area network (LAN), a global network (e.g. Internet), a virtual private network (VPN), and an intranet. The networks 112 may be implemented using wireless networks or any kind of physical network implementation known in the art. One or more communications devices 108A-108D and 110A-110D may be coupled to the host system 102 through multiple networks (e.g., intranet and Internet) so that not all the communications devices 108A-108D and 110A-110D are coupled to the host system 102 through the same network. As indicated above, one or more of the communications devices 108A-108D, 110A-110D and the host system 104 may be connected to the networks 112 in a wireless fashion.

In one exemplary embodiment, the host system 102 is in communication with the storage device 104 over the networks 112. The storage device 104 includes a data repository with data for use in implementing the electronic transaction services and may be implemented using a variety of devices for storing electronic information. It is understood that the storage device 104 may alternatively be implemented using memory contained in the host system 102 or may be a separate physical device. The storage device 104 may be logically addressable as a consolidated data source across a distributed environment that includes networks 112. Information stored in the storage device 104 may be retrieved and manipulated via the host system 102. The data repository of the storage device 104 may include one or more databases containing records (e.g., account records) in support of the electronic transaction services. An exemplary account record 300 for a defined community is shown and described in FIG. 3.

The host system 102 depicted in FIG. 1 may be implemented using one or more servers operating in response to a computer program stored in a storage medium accessible by the server. The host system 102 may operate as a network server (e.g., a web server) to communicate with the communications devices 108 and 110. The host system 102 handles sending and receiving information to and from the communications devices 108 and 110, and can perform associated tasks.

The host system 102 may also operate as an application server. The host system 102 executes a media transaction application 114 to provide the electronic transaction services. As previously described, it is understood that separate servers may be utilized to implement the network server functions and the application server functions. Alternatively, the network server and the application server may be implemented by a single server executing computer programs to perform the requisite functions. The media transaction application 114 may provide offers for transactions that are received from various entities, such as advertisers or the media provider systems 106. According to exemplary embodiments, the media transaction application 114 extends the offers to one or more of the communications devices 108 and 110 and executes an electronic transaction upon acceptance of an offer via, e.g., a user interface component of the application 114. An exemplary user interface screen 400 provided by the user interface component of the application 114 is shown and described in FIG. 4.

The media provider systems 106 may include content provider entities, such as cable television providers, Internet content providers (e.g., Internet radio or television, website content providers), advertising content, or other types of media channels. In one exemplary embodiment, the media provider systems 106 provide content to one or more of the communications devices 108 and 110 and employ the host system 102 to provide offers to these communications devices before, during, or after transmission of the content to one or more of the devices 108, 110. In alternative exemplary embodiments, the media provider systems 106 may execute the media transaction application 114 and provide the offers directly to the communications devices 108, 110.

As indicated above, the electronic transaction services may be provided via the host system 102 according to one exemplary embodiment. It will be understood that the transaction services may be implemented locally on one or more of the communications devices 108 and 110, whereby the corresponding communications devices 108, 110 execute the media transaction application 114. For purposes of illustration, the media transaction application 114 is shown on the IPTV device 108A and laptop 110D in FIG. 1. In this exemplary embodiment, the account record (e.g., the account record 300) for the defined community may be stored locally on one or more of the communications devices 108, 110, as opposed to on the networks 112 (e.g., in the storage device 104). In an alternative exemplary embodiment, a portion of the electronic transaction services may be implemented on the host system 102, and a portion of the electronic transaction services may be implemented on one or more of the communications devices 108 and 110. For example, the host system 102 may provide a Java® applet to one of the communications devices 108, 110 for performing a portion of the electronic transaction services.

As indicated above, the electronic transaction services enable defined communities of users to conduct electronic transactions via selected communications devices defined for the community. In exemplary embodiments, the electronic transactions may be initiated at one communications device and executed on one or more other communications devices within the community. The electronic transactions may include relate to one or more media files, such as an audio file, video file, printed file, multi-media file, or a static image, to name a few. The transaction with respect to the media file may include, e.g., downloading a media file, receiving a coupon or printed item, and recording a media content item, to name a few. The execution of the transaction may occur on one or more of the communications devices 108, 110 of the offerees choosing.

Figure 3:
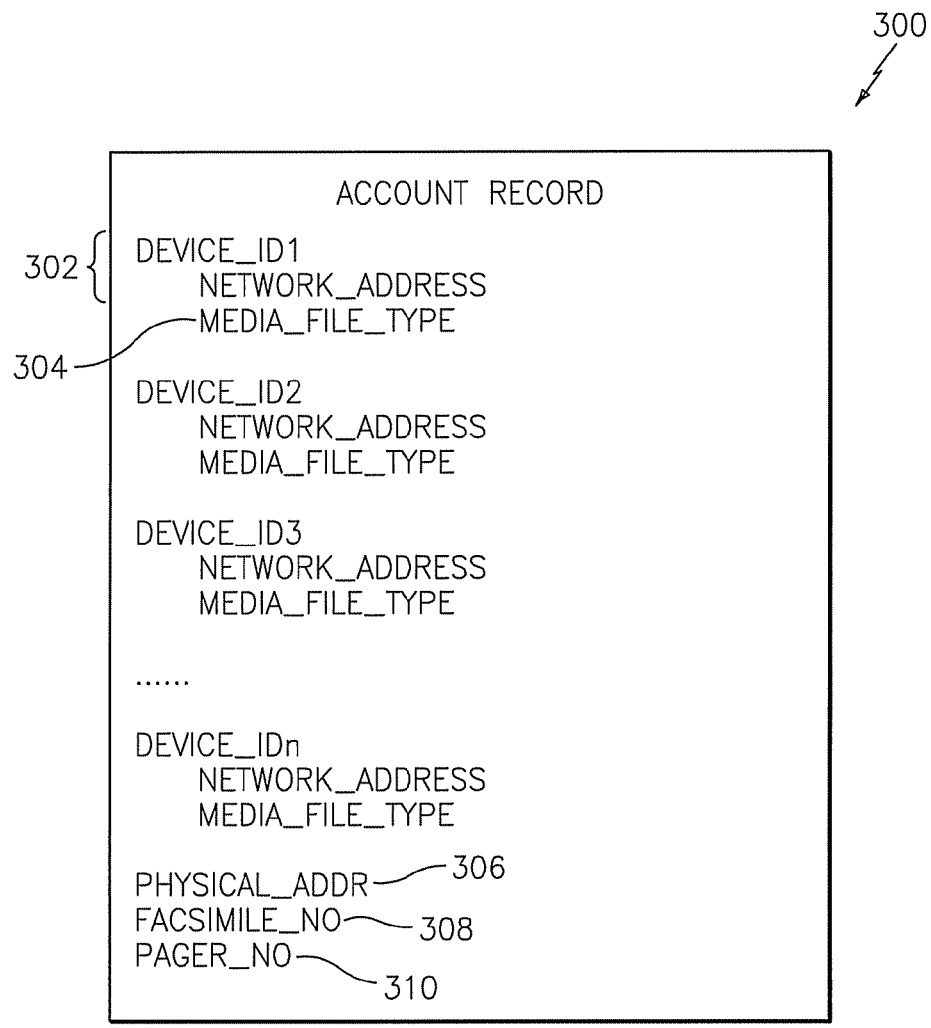
FIG. 3 is an account record used in implementing electronic transactions in accordance with exemplary embodiments.

In exemplary embodiments, the community of users may be members of a household. The members of the household are defined using an account record (e.g., the account record 300 of FIG. 3). As shown in FIG. 3, the account record 300 stores information regarding each of the communications devices defined for the community, according to exemplary embodiments. The account record 300 may be identified using a unique identifier, such as a device identifier for the device receiving the offer. As shown in the account record 300, a device identifier and network address associated with the device, collectively form a device ID 302. The network address specifies the unique address used in executing an electronic transaction. Also shown in the account record 300 is a media file type 304. The media file type 304 indicates the media format in which the communications device is capable of receiving media. For example, a media file distributed to a wireline telephone (e.g., PSTN phone 108C) may need to be in an analog format, in which case the media file type for the device 108C may be expressed as "analog." Other media file types may include, e.g., digital formats, such as .tiff, .pdf, .wav, or other media format types known in the art. The media file type is used by the media transaction application 114 in determining which of the communications devices in the community are capable of receiving the electronic transaction, as will be described further herein.

Also shown in the account record 300 of FIG. 3 are other types of addresses that may be used in executing the electronic transaction. For example, a printed media file may be sent to a community member's home address using a physical address 306 field. Also, a facsimile number 308 may be used to execute an electronic transaction for communications device 108D in FIG. 1, or a media file may be sent to a pager number using a pager number 310 field in the account record 300. Alternatively, a facsimile-based electronic transaction may be implemented using, e.g., fax software on a computer, e.g., the desktop computer 108B or the laptop 110D via the device identifier and network address (device ID 302) fields shown in FIG. 3.

Figure 2:
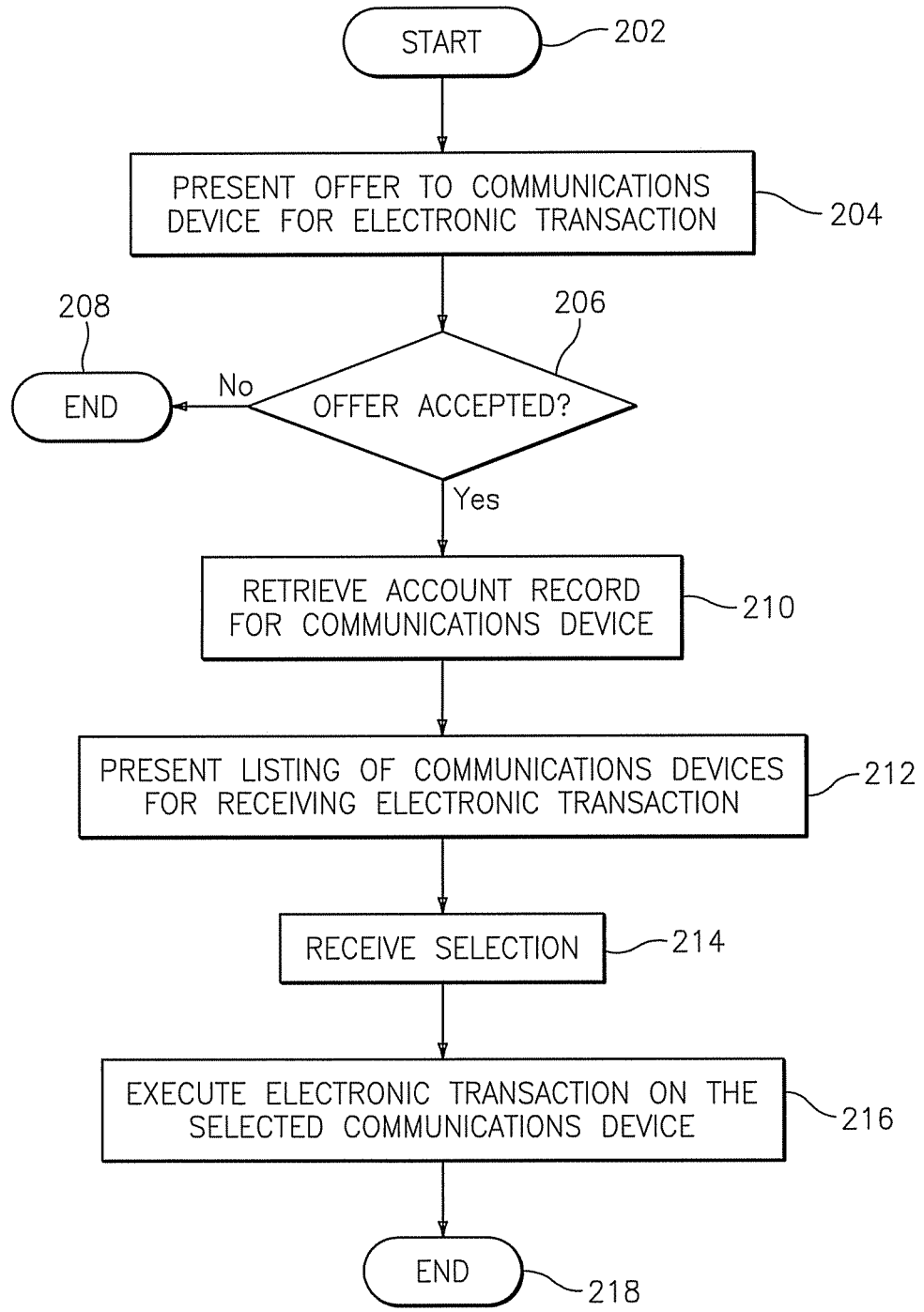
FIG. 2 is a flow diagram describing a process for implementing electronic transactions in accordance with exemplary embodiments.

Turning now to FIG. 2, an exemplary process for implementing the electronic transactions will now be described in accordance with exemplary embodiments. For the processes described in FIG. 2, it is assumed that an account record (e.g., the account record 300) has been established for a community of users. It is also assumed for purposes of illustration that an individual who is receiving content (e.g., from one of the media provider systems 106) is viewing the content on the IPTV device 108A.

The process begins at step 202 whereby the media transaction application 114 presents an offer to the IPTV device 108A during a programming event. This may be implemented as a picture-in-picture screen, a ticker, or other means of presentation. In an exemplary embodiment, the offer is presented to the IPTV device 108A and may relate to an electronic transaction to be performed on another communications device (e.g., one or more of the communications devices 108B-108D and 110A-110D).

At step 204, the media transaction application 114 receives one of an acceptance or rejection from the communications device 108A for the offer. This may be implemented via the IPTV device 108A via an option to accept or reject. If the offer is rejected at step 206, the process ends. Otherwise, if the offer is accepted at step 204, the media transaction application 114 retrieves an account record (e.g., the account record 300 of FIG. 3) using, e.g., the device identifier of the communications device 108A at step 208. In one exemplary embodiment, the device identifier of the IPTV device 108A may be automatically transmitted to the media transaction application 114 and may include, e.g., the MAC address or GUID of the set top box).

Figure 4:
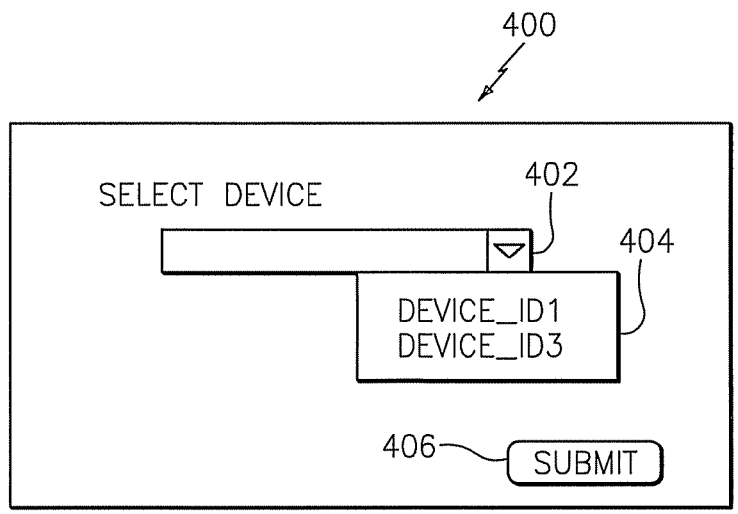
FIG. 4 is a user interface screen for use in implementing electronic transactions in accordance with exemplary embodiments.

At step 210, the media transaction application 114 presents a listing of communications devices for selection via a user interface of the media transaction application 114. As shown in FIG. 4, a sample user interface screen, such as the user interface screen 400, is presented on one of the communications devices (in this example, on the communications device 108A). As shown in FIG. 4, the user may view a listing of available communications devices by selecting an option 402 on the user interface screen 400. Upon this selection, a window 404 provides a listing of the available devices. The media transaction application 114 selects those communications devices from the listing in the account record 300 in which the media file type 304 is compatible with the media file type of the media file subject to the electronic transaction. The listing of available communications devices shown in the window 404 reflects the compatible communications devices. The user selects one or more of the listed devices in the window 404, followed by selecting a submit option 406.

At step 212, the media transaction application 114 receives the selection, retrieves the network address or other address (e.g., addresses 306-310), and executes the corresponding electronic transaction on the selected communications devices at step 214. As indicated above, the electronic transaction may include transmitting a media file to the selected communications devices. Alternatively, the electronic transaction may include recording a media content item (program) on the selected communications devices when the media content item is broadcast (e.g., at the time of broadcast). The offer initially presented on the communications device (e.g., the IPTV device 108A) may be associated with a subject that is related to the programming being presented on the communications device at the time of the offer.

Once the electronic transaction has been executed, the process ends at step 216.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing an electronic transaction, comprising:
    presenting an offer on a communications device to conduct the electronic transaction, the offer presented during a programming event occurring on the communications device, the programming event including content presented by a content provider over a media channel, the presenting the offer including presenting the offer in conjunction with the content; and
    in response to an acceptance of the offer by the communications device:
    determining a media file type associated with a subject of the offer;
    presenting notification, via a user interface at the communications device, of another communications device that is compatible with the media file type associated with the subject of the offer;
    receiving, from the communications device, a selection comprising the other communications device;
    retrieving, from an account record associated with the communications device, a network address for the other communications device, each of the communications device and the other communications device in the account record associated with a pre-defined community of users, wherein the presenting notification of another communications device that is compatible with the media file type is implemented in response to identifying the media file type listed in the account record for the other communications device; and
    executing the electronic transaction on the other communications device via the network address, the electronic transaction comprising transmitting a media file having the media file type.

2. The method of claim 1, wherein retrieving the network address for the other communications device includes retrieving the network address from the account record via a device identifier of the communications device.

3. The method of claim 1, wherein the media file comprises a multi-media file.

4. The method of claim 1, wherein the communications device is an Internet Protocol-enabled television, the method further comprising:
    presenting the offer via a picture-in-picture presentation on the Internet Protocol-enabled television.

5. The method of claim 1, wherein the communications device is an Internet Protocol-enabled television, the method further comprising:
    presenting the offer via a ticker presentation on the Internet Protocol-enabled television.

6. The method of claim 1, wherein content of the offer relates to a media content item presented on the communications device, and the offer is presented at the time in which the media content item is presented, the media content item being a broadcast television program.

7. The method of claim 1, wherein the offer further includes a recording service and wherein the electronic transaction includes recording a media file on the other communications device at the time of broadcast of the media file.

8. The method of claim 1, wherein the communications device includes an Internet Protocol-enabled television.

9. A system for providing an electronic transaction, comprising:
    a computer system; and
    a media transaction application executing on the computer system, the media transaction application implementing a method, comprising:
    presenting an offer on a communications device to conduct the electronic transaction, the offer presented during a programming event occurring on the communications device, the programming event including content presented by a content provider over a media channel, the presenting the offer including presenting the offer in conjunction with the content; and
    in response to an acceptance of the offer by the communications device:
    determining a media file type associated with a subject of the offer;
    maintaining an account record associated with the communications device, a network address for another communications device, a media file type listed in the account record for the other communications device, each of the communications device and the other communications device in the account record associated with a pre-defined community of users;
    presenting notification, via a user interface at the communications device, the other communications device that is compatible with the media file type associated with the subject of the offer, wherein the presenting notification to the other communications device that is compatible with the media file type is implemented in response to identifying the media file type listed in the account record for the other communications device;
    receiving, from the communications device, a selection comprising the other communications device;
    retrieving, from the account record associated with the communications device, a network address for the other communications device, each of the communications device and the other communications device in the account record associated with a pre-defined community of users; and executing the electronic transaction on the other communications device via the network address, the electronic transaction comprising transmitting a media file having the media file type.

10. The system of claim 9, wherein retrieving the network address for the other communications device includes retrieving the network address from the account record via a device identifier of the communications device.

11. The system of claim 9, wherein the media file comprises a static image.

12. The system of claim 9, wherein the communications device is an Internet Protocol-enabled television, the method further comprising:
presenting the offer via a picture-in-picture presentation on the Internet Protocol-enabled television.

13. The system of claim 9, wherein the communications device is an Internet Protocol-enabled television, the method further comprising:
presenting the offer via a ticker presentation on the Internet Protocol-enabled television.

14. The system of claim 9, wherein content of the offer relates to a media content item presented on the communications device, and the offer is presented at the time in which the media content item is presented, the media content item being a broadcast television program.

15. The system of claim 9, wherein the offer further includes a recording service and wherein the electronic transaction includes recording a media file on the other communications device at the time of broadcast of the media file.

16. The system of claim 9, wherein the other communications device includes a cellular telephone.

17. A computer program product for providing an electronic transaction, the computer program product comprising a non-transitory computer readable storage medium having instructions embodied thereon, which when executed by a computer cause the computer to implement operations, comprising:
presenting an offer on a communications device to conduct the electronic transaction, the offer presented during a programming event occurring on the communications device, the programming event including content presented by a content provider over a media channel, the presenting the offer including presenting the offer in conjunction with the content; and in response to an acceptance of the offer by the communications device:
determining a media file type associated with a subject of the offer;
presenting notification, via a user interface at the communications device, of another communications device that is compatible with the media file type associated with the subject of the offer;
receiving, from the communications device, a selection comprising the other communications device;
retrieving, from an account record associated with the communications device, a network address for the other communications device, each of the communications device and the other communications device in the account record associated with a pre-defined community of users, wherein the presenting notification of another communications device that is compatible with the media file type is implemented in response to identifying the media file type listed in the account record for the other communications device; and
executing the electronic transaction on the other communications device via the network address, the electronic transaction comprising transmitting a media file having the media file type;
wherein retrieving the network address for the other communications device includes retrieving the network address from the account record via a device identifier of the communications device
wherein the communications device is an Internet Protocol-enabled television, the method further comprising presenting the offer during a programming event via a picture-in-picture presentation on the Internet Protocol-enabled television;
wherein the content of the offer relates to a media content item presented on the communications device, and the offer is presented at the time in which the media content item is presented, the media content item being a broadcast television program; and
wherein the offer is an audio file, the other communications device is a cellular telephone, and the electronic transaction comprises transmitting the audio file to the cellular telephone.

18. The computer program product of claim 17, wherein the media file comprises an audio file.

* * * * *